(12) United States Patent
Tanaka

(10) Patent No.: US 10,821,689 B2
(45) Date of Patent: Nov. 3, 2020

(54) MOLD FOR MOLDING TIRE AND PNEUMATIC TIRE

(71) Applicant: TOYO TIRE CORPORATION, Itami-shi, Hyogo (JP)

(72) Inventor: Masaya Tanaka, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 16/440,001

(22) Filed: Jun. 13, 2019

(65) Prior Publication Data

US 2020/0001558 A1    Jan. 2, 2020

(30) Foreign Application Priority Data

Jun. 29, 2018 (JP) ................................. 2018-125057

(51) Int. Cl.
*B29D 30/06* (2006.01)

(52) U.S. Cl.
CPC ...... *B29D 30/0606* (2013.01); *B29D 30/0629* (2013.01); *B29D 2030/0612* (2013.01)

(58) Field of Classification Search
CPC ............ B29D 30/0606; B29D 30/0629; B29D 2030/0612; B29C 33/005
See application file for complete search history.

(56) References Cited

U.S. PATENT DOCUMENTS

| 6,416,304 B1 * | 7/2002 | Tanaka | B29C 33/10 |
| | | | 425/28.1 |
| 9,333,718 B2 * | 5/2016 | Roty | B29D 30/0629 |
| 9,492,980 B2 * | 11/2016 | Kawagoe | B29C 33/02 |

FOREIGN PATENT DOCUMENTS

| JP | 2005-178120 A | 7/2005 |
| JP | 2012-101383 A | 5/2012 |

* cited by examiner

*Primary Examiner* — James P Mackey
(74) *Attorney, Agent, or Firm* — Westerman, Hattori, Daniels & Adrian, LLP

(57) ABSTRACT

A mold for vulcanizing a tire includes a plurality of first and second sectors alternatively arranged in parallel in a circumferential direction to form an annular shape. A projecting portion formed across the first sector and the second sector includes a first convex portion whose occupied volume is larger, which is formed in the first sector, and a second convex portion whose occupied volume is smaller, which is formed in the second sector. The second convex portion has a length of at least 1.5 mm along an extending direction of the protrusions from an end surface of the second sector and has substantially the same height as the protrusions, and a corner portion of an end surface side of the first sector is chamfered.

4 Claims, 4 Drawing Sheets

F I G. 1
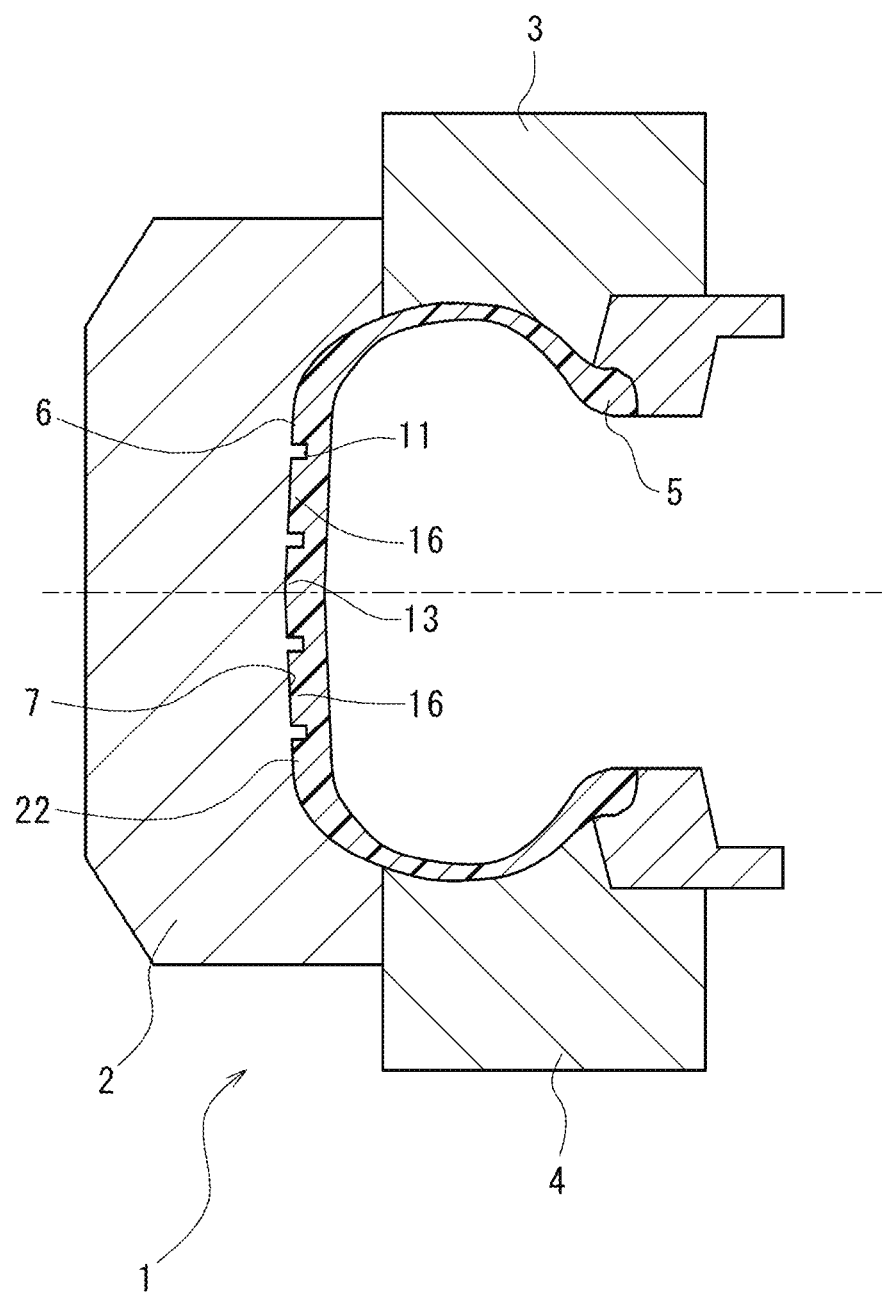

MOLD FOR MOLDING TIRE AND PNEUMATIC TIRE

CROSS-REFERENCE TO RELATED APPLICATIONS

This application claims priority of Japanese Patent Application No.: 2018-125057 filed on Jun. 29, 2018, the content of which is incorporated herein by reference.

BACKGROUND OF THE INVENTION

Technical Field

The present invention relates to a mold for molding a tire and a pneumatic tire.

Related Art

Conventionally, the following molds for molding a tire have been known.

JP 2005-178120 A discloses a mold for vulcanizing and molding a tire, in which a pair of adjacent sectors is divided at a position on an inclined groove forming bone, and is cut out so as to reduce the height and width of the obtained small divided pieces.

JP 2012-101383 A discloses a mold for vulcanizing a tire, in which a projection for a lateral groove, which is formed across a dividing position of a sector, is bent so as not to be overlapped with the dividing position.

However, in the mold disclosed in JP 2005-178120 A, the small divided pieces are partially cut away into further smaller pieces, and hence there is a risk that the smaller pieces may be mistaken for burrs and removed in a processing step.

In the mold disclosed in JP 2012-101383 A, the bent lateral groove is formed in accordance with the shape of the projection for a lateral groove, and hence uneven wear is liable to occur in an obtained pneumatic tire.

An object of the present invention is to provide a mold for molding a tire which is not erroneously processed and is less liable to cause uneven wear in a portion constituting an inclined groove of an obtained pneumatic tire.

SUMMARY

As a measure for solving the problems described above, according to the present invention, there is provided a mold for vulcanizing a tire, the mold including a plurality of sectors arranged in parallel in a circumferential direction to form an annular shape, wherein each of the sectors includes protrusions for forming a plurality of main grooves extending in a tire circumferential direction on a product tire, and a projecting portions for forming a plurality of inclined grooves extending in a tire width direction so as to intersect the main grooves, wherein the sectors include a first sector and a second sector adjacent to each other, wherein the projecting portion formed across the first sector and the second sector includes a first convex portion whose occupied volume is larger, which is formed in the first sector, and a second convex portion whose occupied volume is smaller, which is formed in the second sector, and wherein the second convex portion has a length of at least 1.5 mm along an extending direction of the protrusions from an end surface of the second sector and has substantially the same height as the protrusions, and a corner of an end surface side of the first sector is chamfered.

With this configuration, the second convex portion has a sufficient size so as not to be removed accidentally. In addition, a corner portion is chamfered, and hence, when the mold is closed, the end surfaces of the sectors are less liable to be damaged if they collide with each other. Moreover, the second convex portion is formed on the extension of the first convex portion at substantially the same height as the first protrusion. For this reason, uneven wear is less liable to occur in a portion constituting a lateral groove of an obtained pneumatic tire.

It is preferable that a corner portion of the second convex portion is formed into a curved surface shape having a curvature radius R.

With this configuration, it is possible to more easily avoid damage to the second convex portion when the mold is closed. Further, the obtained pneumatic tire can also be configured so as not to be easily damaged by uneven wear and the like.

It is preferable that the curvature radius R of the corner portion of the second convex portion is formed so as to gradually decrease from a projecting side of the projecting portion toward a base side.

With this configuration, damage to the second convex portion can be further easily avoided, and the obtained pneumatic tire can also be less liable to be damaged due to uneven wear and the like.

It is preferable that a maximum curvature radius of the corner portion of the second convex portion is 0.3 mm or more.

With this configuration, damage to the corner portion of the second convex portion when the mold is closed can be appropriately prevented.

According to the present invention, it is possible to prevent the second convex portion from being erroneously removed in the middle of processing. Even if the mold is closed and the end surfaces of the sectors collide with each other, the second convex portion is not easily damaged, and the durability can be enhanced. In the obtained pneumatic tire, uneven wear is less liable to occur in the inclined grooves, and the durability of the tire itself can also be enhanced.

BRIEF DESCRIPTION OF THE DRAWINGS

The foregoing and the other features of the present invention will become apparent from the following description and drawings of an illustrative embodiment of the invention in which:

FIG. 1 is a partial sectional view of a mold for vulcanizing a tire according to the present embodiment;

DETAILED DESCRIPTION OF EMBODIMENTS

Figure 2:
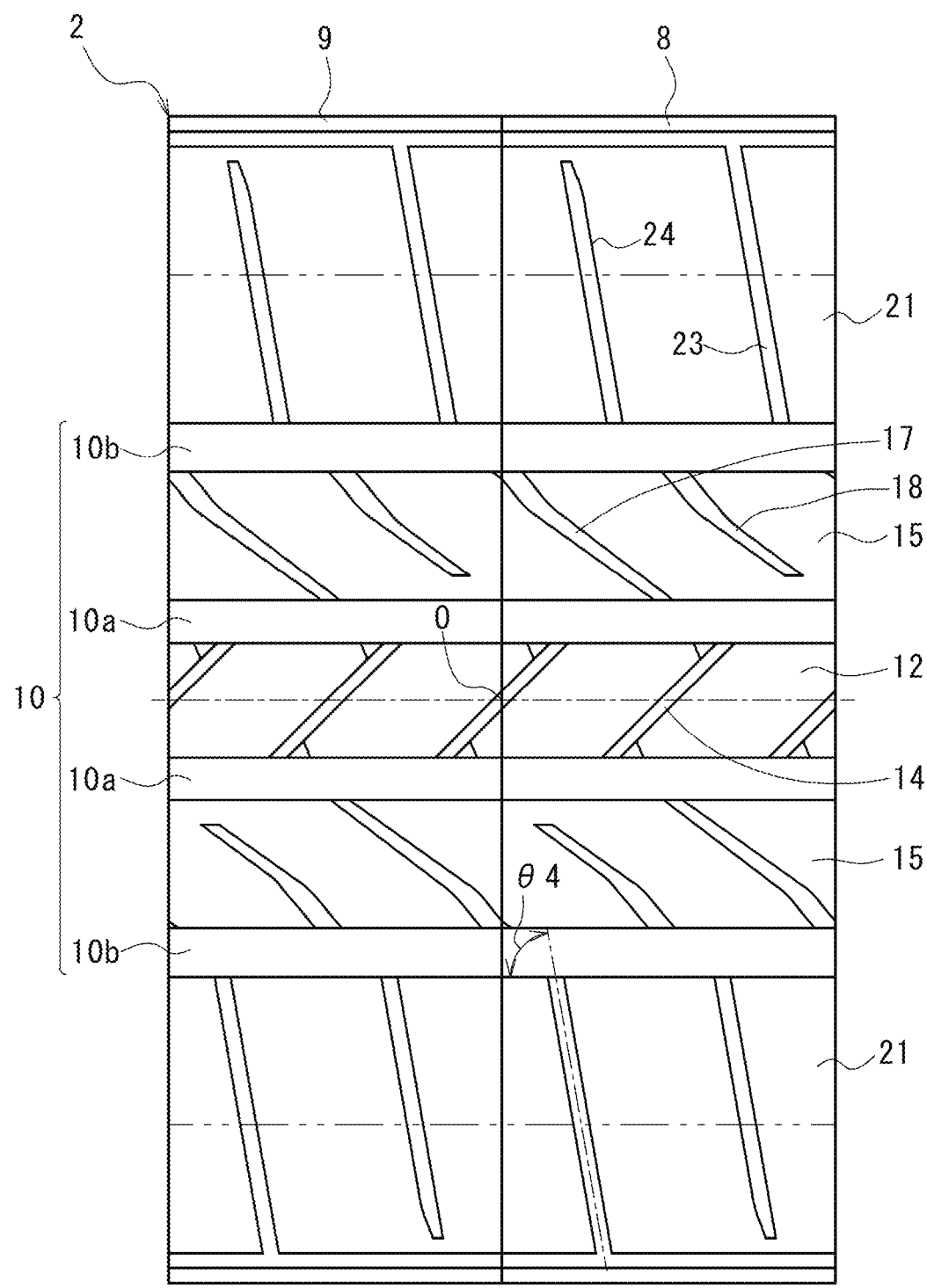
FIG. 2 is a development view for illustrating tread molding surfaces of two sectors of the mold for vulcanizing a tire illustrated in FIG. 1.

Hereinafter, embodiments of the present invention are described with reference to the attached drawings.

FIG. 1 is a sectional view for illustrating a part of a mold for vulcanizing a tire (hereinafter, simply referred to as a "mold") according to the present embodiment. A mold 1 includes a sector 2, an upper mold 3, and a lower mold 4.

The sector 2 is made of aluminum alloy and is divided into a plurality of parts in a tire circumferential direction so as to be reciprocally movable in a radial direction. The sectors 2 are annularly connected in a state of being moved to the inner diameter side, and the formed inner circumferential surface constitutes a tread molding surface 7 for molding a tread portion 6 of a pneumatic tire 5.

FIG. 2 is a developed view for illustrating a part of the tread molding surface 7 formed by two adjacent sectors (first sector 8 and second sector 9). The tread molding surface 7 is formed with four protrusions 10 extending in parallel in the circumferential direction of the sectors 2 annularly connected (left and right direction in the drawing). Main grooves 11 are formed in the pneumatic tire 5 by the protrusions 10.

A central groove 12 is formed between two protrusions 10 at the center (first protrusions 10a). A center rib 13 is formed on the pneumatic tire 5 by the central groove 12. First projecting portions 14 which are inclined obliquely upward to the right in the figure are formed on the groove bottom of the central groove 12 at a predetermined pitch in the lateral direction in the figure. The heights of the first projecting portions 14 are lower than the heights of the first protrusions 10a, and a plurality of inclined slits arranged in parallel in the tire circumferential direction are formed in the center rib 13 of the pneumatic tire 5. With this, a block row including a plurality of blocks is formed in the center rib 13.

Mediate grooves 15 are formed between protrusions 10 (second protrusions 10b) on both sides and the first protrusions 10a adjacent to the second protrusions 10b. Mediate ribs 16 are respectively formed on the pneumatic tire 5 by these mediate grooves 15. A plurality of second projecting portions 17 and a plurality of third projecting portions 18 which protrude from the second protrusion 10b are alternately formed on the groove bottom of the mediate groove 15 at a predetermined pitch in the lateral direction in the figure. The second projecting portion 17 connects the first protrusion 10a and the second protrusion 10b, and the third projecting portion 18 extends from the second protrusion 10b and terminates in the mediate groove 15 without reaching the first protrusion 10a. In the figure, in the upper half and the lower half, the second projecting portions 17 and the third projecting portions 18 are arranged point-symmetrically with the point O as a center. With the second projecting portions 17 and the third projecting portions 18, a plurality of inclined grooves arranged in parallel in the tire circumferential direction can be formed in the mediate rib 16 of the pneumatic tire 5.

The second projecting portions 17 will be described in detail focusing on the upper half in FIG. 2. Here, the second projecting portions 17 are formed across the two sectors 2 (first sector 8 and second sector 9).

In the first sector 8, a first convex portion 19 which occupies most of the second projecting portion 17 is formed. The first convex portion 19 is inclined in a direction opposite to that of the first projecting portion formed on the central groove 12 and is directed obliquely upward to the left in the figure. The first convex portion 19 includes a first inclined portion 19a extending from the first protrusion 10a and a second inclined portion 19b extending from the first inclined portion 19a to the second protrusion 10b. An angle θ1 formed by the center line of the first inclined portion 19a and a straight line extending in the tire circumferential direction in the figure is set smaller than an angle θ2 formed by the center line of the second inclined portion 19b and the straight line (θ1<θ2). The first inclined portion 19a is formed to have a width that gradually increases toward the second inclined portion 19b. The first inclined portion 19a and the second inclined portion 19b are connected by a curved portion 19c. The second inclined portion 19b is formed to have a uniform width, and the value thereof is larger than the maximum width of the first inclined portion 19a.

Figure 3:
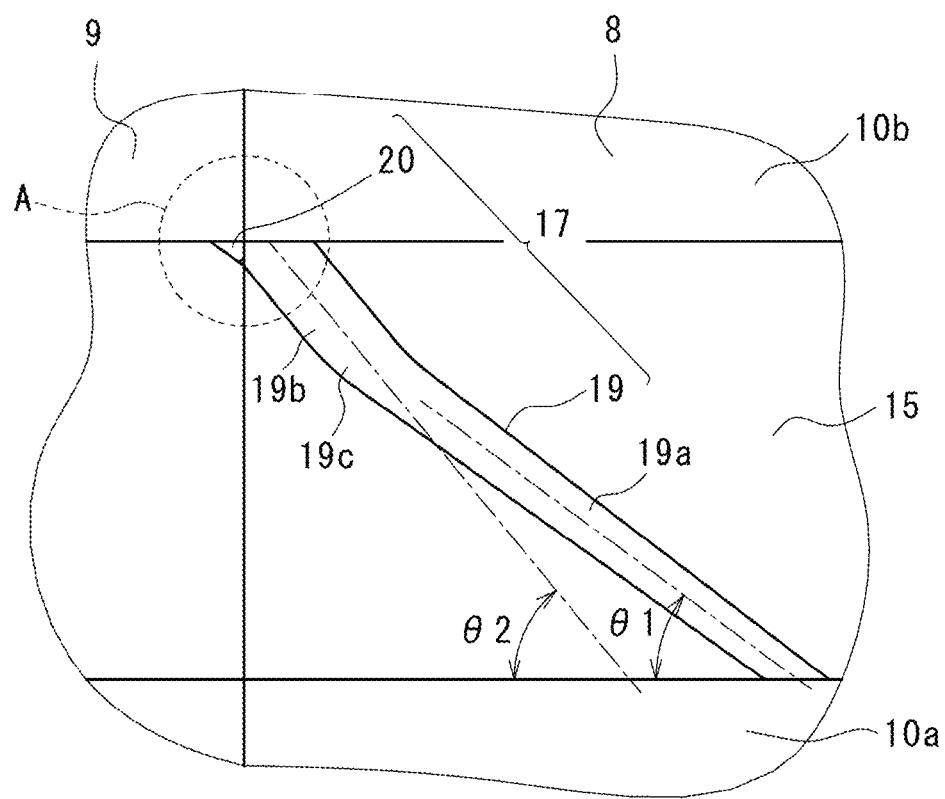
FIG. 3 is a partial enlarged view for illustrating a second projecting portion of FIG. 2.
Figure 4:
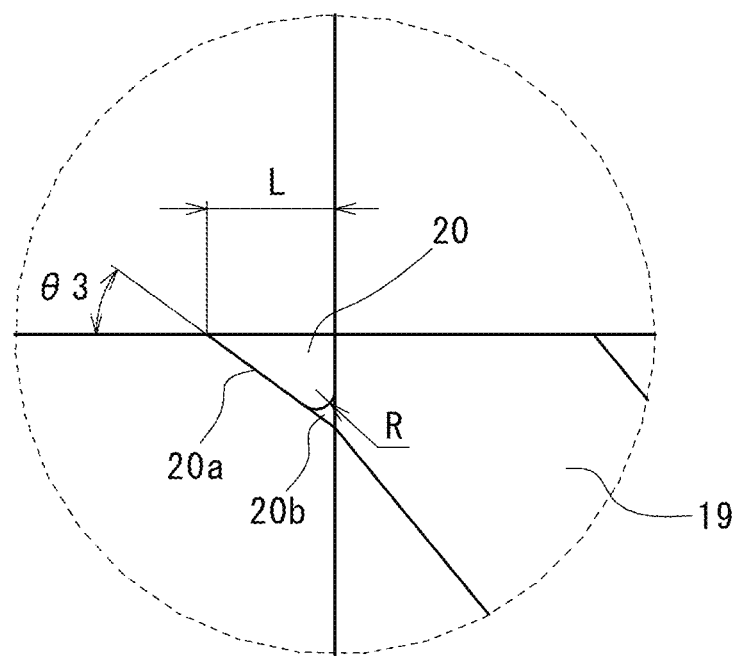
FIG. 4 is an enlarged view for illustrating the main part A of FIG. 3.
Figure 5:
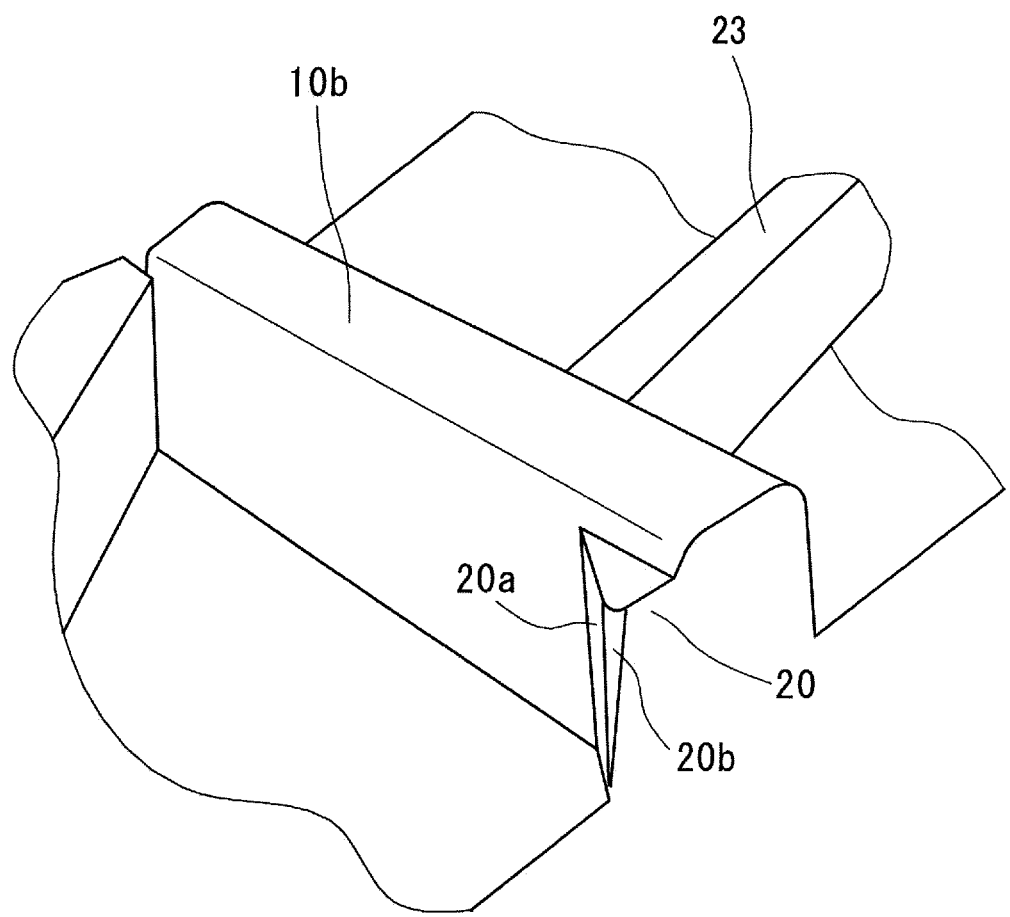
FIG. 5 is a partial enlarged perspective view for illustrating the second convex portion of FIG. 2.

In the second sector 9, a second convex portion 20 having a smaller occupied volume than the first convex portion 19 is formed at the distal end of the second projecting portion 17. As illustrated in FIG. 3, the second convex portion 20 extends from one end surface (sector end surface) of the second protrusion 10b along the side surface of the second protrusion 10b. The end surface of the second convex portion 20 is flush with the end surface of the second protrusion 10b, and abuts on the end surface of the second projecting portion 17 (second inclined portion 19b) of the first sector 8. The side surface of the second convex portion 20 is inclined so as to gradually approach the side surface of the second protrusion 10b.

A length L of the second convex portion 20 in the direction in which the second protrusion 10b extends is set to 1.5 mm or more and 10 mm or less. If the length L of the second convex portion 20 is less than 1.5 mm, it is difficult for an operator to distinguish between the second convex portion 20 and burr, and there is a risk that the second convex portion 20 may be erroneously removed. Meanwhile, if the length L of the second convex portion 20 exceeds 10 mm, there is a problem that uneven wear is liable to occur.

Further, an angle 83 formed by a side surface 20a of the second convex portion 20 to the straight line extending in the tire circumferential direction in the figure is smaller than the angle θ2 formed by the center line of the second inclined portion 19b of the first convex portion 19 to the straight line. (θ2>θ3).

An intersecting portion 20b where the end surface and the side surface of the second convex portion 20 intersect is constituted by an arc surface whose curvature radius is different in the vertical direction. A curvature radius R of the arc surface has the maximum value on the upper surface of the second convex portion 20, and is set to 0.3 mm or more and 1.5 mm or less. If the curvature radius R of the arc surface constituting the intersecting portion 20b is less than 0.3 mm, there is a problem that the intersecting portion 20b is easily damaged. On the other hand, if the curvature radius R of the arc surface constituting the intersecting portion 20b exceeds 1.5 mm, there is a problem that uneven wear is liable to occur. The curvature radius R of the arc surface gradually decreases toward the base side of the second convex portion 20 and is substantially zero at the base.

The first convex portion 19 and the second convex portion 20 have the same height. Further, the first convex portion 19 and the second convex portion 20 have substantially the same height as the second protrusion 10b. Specifically, the first convex portion 19 and the second convex portion 20 are formed lower than the second protrusion 10b by arc surfaces formed on both side portions thereof.

Shoulder grooves 21 are formed in the width direction (vertical direction in the figure) of the sector 2 by the respective second protrusions 10b. Shoulder ribs 22 are formed on the pneumatic tire 5 by the shoulder grooves 21. Fourth projecting portions 23 and fifth projecting portions 24 are formed on the groove bottom of the shoulder groove alternately at a predetermined pitch in the lateral direction in the drawing. The fourth projecting portion 23 extends from the second protrusion 10b to the end of the sector 2. The fifth projecting portion 24 extends from the second protrusion 10b and terminates in the shoulder groove 21. The inclination directions of the fourth projecting portion 23 and the fifth projecting portion 24 are the same as those of the second projecting portion 17 and the third projecting portion 18, but the inclination angles are different. That is, an angle 84 formed by the fourth projecting portion 23 or the fifth projecting portion 24 and the straight line extending in the tire circumferential direction in the drawing is larger than the angle θ2 formed by the second projecting portion 17 or the third projecting portion 18, for example, the second inclined portion 19b and the straight line. A plurality of slits extending in the tire width direction and arranged in parallel in the tire circumferential direction can be formed in the shoulder rib 22 of the pneumatic tire 5 obtained by vulcanization molding with the fourth projecting portions 23 and the fifth projecting portions 24.

According to the mold 1 of the above-described configuration, even if the second projecting portion 17 is formed across the two sectors 2, the following effects can be obtained by devising the shape of the second convex portion 20 formed in one of the sectors 2 as described above.

The height dimension of the second convex portion 20 is the same as the first convex portion 19 and substantially the same as the second protrusion 10b. Therefore, such a configuration can be obtained that the depths of the slits formed by the second projecting portions 17 after vulcanization molding are made uniform so that uneven wear is less liable to occur.

The intersecting portion 20b of the second convex portion 20 is chamfered to form an arc surface. Therefore, such a configuration can be obtained that the second convex portion 20 is hardly damaged. In particular, the maximum curvature radius of the intersecting portion 20b is set to 0.3 mm or more. Therefore, the strength of the second convex portion 20 can be sufficiently increased. As a result, the sector 2 can be used in good condition for a long time.

The length L of the second convex portion 20 is set to 1.5 mm or more. Therefore, the operator does not mistake the second convex portion 20 for burr and remove the convex portion erroneously.

It should be noted that the present invention is not limited to the configuration described in the embodiment described above, and various modifications are possible.

In the embodiment described above, the example in which the second projecting portion 17 is formed across two sectors 2 has been described, but even in a case where the third projecting portion 18 is formed across two sectors 2, the same configuration as described above can be adopted. In addition, even in a case of another pneumatic tire different from the illustrated tread pattern, in a case where a long projecting portion extending in the tire circumferential direction is to be formed across the two sectors 2, the same configuration as described above can be adopted for one part of the projecting portion whose occupied volume is smaller.

In the embodiment described above, the arc surface is formed at the intersecting portion of the second convex portion 20. However, the present invention is not limited to the arc surface, and chamfering with a tapered surface may be performed. In this case, it is preferable to form a triangular shape in which the area of the tapered surface gradually decreases from the projecting side of the second convex portion 20. Moreover, the present invention is not limited to the tapered surface and to the configuration that the upper surface of the intersecting portion is surrounded by an arc or three sides, and may have a configuration that the upper surface of the intersecting portion is surrounded by four or more sides as long as a part which protrudes at an acute angle can be eliminated.

What is claimed is:

1. A mold for vulcanizing a tire, the mold comprising a plurality of sectors arranged in parallel in a circumferential direction to form an annular shape,
    wherein each of the sectors includes protrusions for forming a plurality of main grooves extending in a tire circumferential direction on a product tire, and projecting portions for forming a plurality of inclined grooves extending in a tire width direction so as to intersect the main grooves,
    wherein the sectors include a first sector and a second sector adjacent to each other,
    wherein at least one of the projecting portions is formed across the first sector and the second sector, and includes a first convex portion being formed in the first sector and a second convex portion being formed in the second sector, the second convex portion having an occupied volume that is smaller than an occupied volume of the first convex portion,
    wherein the second convex portion has a length of at least 1.5 mm along an extending direction of the protrusions from an end surface of the second sector and has substantially the same height as the protrusions, and
    wherein the second convex portion has a corner portion abutting on an end surface of the first sector, the corner portion being chamfered.

2. The mold for vulcanizing a tire according to claim 1, wherein the corner portion of the second convex portion is formed into a curved surface shape having a curvature radius R.

3. The mold for vulcanizing a tire according to claim 2, wherein the curvature radius R of the corner portion of the second convex portion is formed so as to gradually decrease from a projecting side of the projecting portion toward a base side.

4. The mold for vulcanizing a tire according to claim 3, wherein a maximum curvature radius of the corner portion of the second convex portion is 0.3 mm or more.

* * * * *